United States Patent Office 3,202,720
Patented Aug. 24, 1965

3,202,720
MANUFACTURE OF SATURATED PERFLUORO-
CARBONS BY THE CATALYTIC PYROLYSIS OF
FLUOROFORM
Murray Hauptschein, Glenside, and Arnold H. Fainberg, Elkins Park, Pa., assignors to Pennsalt Chemicals Corporation, Philadelphia, Pa., a corporation of Pennsylvania
No Drawing. Filed Dec. 28, 1961, Ser. No. 162,944
6 Claims. (Cl. 260—653)

This invention relates to the production of fluorocarbons by the pyrolysis of fluoroform in the presence of an activated carbon catalyst.

The pyrolysis of fluoroform to produce fluorocarbons is described in U.S. Patent 3,009,966 of Murray Hauptschein and Arnold H. Fainberg. As set out in detail in that patent, it was found that the uncatalyzed pyrolysis of fluoroform produces perfluoroolefins, particularly tetrafluoroethylene and hexafluoropropene, as the major product, with only small quantities of saturated fluorocarbons.

In accordance with the present invention, it has now been found that when the pyrolysis of fluoroform is carried out in the presence of an activated carbon catalyst, the production of saturated fluorocarbons, particularly saturated perfluorocarbons in the $C_1$ to $C_4$ range, is greatly increased at the expense of the unsaturated products. By proper selection of the pyrolysis temperature, a product may be obtained consisting largely of saturated perfluorocarbons principally $CF_4$, $C_2F_6$ and $C_3F_8$, and containing only small amounts of olefinic products. These lower saturated perfluorocarbons display a high degree of chemical inertness and thermal stability, and are useful as low temperature refrigerants, heat exchange fluids and dielectric media.

modified by the presence of other materials. In particular, it has been found that when the activated carbon is impregnated with a chloride of a metal of group IIA of the periodic table of elements such as magnesium chloride, or strontium chloride and particularly barium chloride, there is a tendency to form increased amounts of $C_2F_6$ and $C_3F_8$ and lesser amounts of $CF_4$, and also a tendency to suppress the formation of olefins. The impregnation of the activated carbon with the metal chloride is conveniently accomplished by impregnating the activated carbon with an aqueous solution of the chloride followed by drying to deposit the desired amount of metal chloride uniformly distributed over the surface of the activated carbon. Generally, the amount of metal chloride may range from 1 to 50% by weight of the weight of the activated carbon and more usually in the range of from about 10 to 40%.

The catalytic pyrolysis reaction of the invention is carried out at temperatures of from about 500° to 1200° C. Optimum temperatures of operation will generally lie in the range of from 650° to 1000° C. where the best combination of relatively high conversions and good yields of saturated perfluorocabons in the $C_1$ to $C_4$ range will generally be obtained.

The contact time of the reactants with the catalyst may vary over a wide range depending upon the temperature employed. As the temperature increases shorter contact times are used. Thus, contact times as long as 10 minutes at the lower temperatures to as short as 0.001 second at the upper temperature limit may be employed. In the preferred temperature range of from 650° to 1000° C., contact tims of from about 0.5 to 60 seconds will generally be used. As the term is used herein, contact time is defined as follows:

$$\text{Contact time (seconds)} = \frac{\text{volume occupied by catalyst bed}}{\text{volume of gas per second (calculated at reaction temperature and pressure) fed to the catalyst bed.}}$$

Any of the various types of activated carbons in granular or powder form may be employed. As well recognized in the art, activated carbon is characterized by its high surface area resulting from a highly porous structure. Typically, activated carbons have surface areas (as determined for example by gas adsorption techniques) of the order of 200 to 1500 square meters per gram. They are usually prepared from various carbonaceous materials such as bituminous coal, wood, coconut shell, petroleum residue and the like by destructive distillation or other techniques providing a porous structure of high surface area.

The activated carbon catalyst can be used in any desired form, e.g., in the form of a fixed bed of granules or pellets, e.g., ⅛" to 2" in size, or as a fluidized bed of fine particles in accordance with well known fluidized bed techniques. When employed as a fixed bed of pellets, the reactor may conveniently consist of tubes having a diameter of, e.g., ½" to 6" packed with pellets or granules of the activated carbon. The catalyst bed can be heated by any desired means such as by an electric furnace surrounding the catalyst-packed tube. The catalyst tube should be constructed of materials resistant to attack by the reactants or reaction products at the operating temperatures. Preferred materials of this type include, e.g., nickel, platinum, stainless steel, Inconel, Monel metal or the like.

The activated carbon catalyst can be used as such, or

Reaction pressure is not critical and may be atmospheric, subatmospheric, or super-atmospheric. While atmospheric pressure operation will generally be found most convenient, sub-atmospheric pressures ranging as low as about 25 mm. Hg as a practical limit may be found useful in some cases. Super-atmospheric pressures may range, e.g., up to about 10 atmospheres.

The composition of the pyrolysis products will vary somewhat depending upon the reaction conditions, particularly the temperature. In general, higher temperatures favor higher proportions of unsaturated fluorocarbons. Optimum yields of saturated fluorocarbons are generally obtained in the intermediate range of temperatures of 650° to 1000° C. A particularly preferred range for maximum yields of saturated fluorocarbons and good conversions is in the range of from about 700° to 950° C. The olefinic products are principally tetrafluoroethylene, hexafluoropropene, and $C_4$ olefins, mainly perfluoroisobutylene. If desired, the olefinic product may be recycled with fresh fluoroform feed to increase the overall yield of saturated fluorocarbons.

In addition to saturated perfluorocarbons ranging from $CF_4$ to $C_4F_{10}$, there is sometimes produced small amounts of perfluorocarbon monohydrides, such as $C_2HF_5$ and $C_3HF_7$. These are probably formed by the addition of hydrogen fluoride split off during the pyrolysis to perfluoroolefins also formed in the situ during the pyrolysis.

While the invention does not depend upon any particular reaction mechanism, it is probable that the reaction of the invention involves the following stoichiometry for the various products formed:

(1) $2CHF_3 \rightarrow CF_4 + C + 2HF$
(2) $3CHF_3 \rightarrow C_2F_6 + C + 3HF$ fluoroform per volume of catalyst per hour was used (contact time of about 2 seconds). The reactor effluent is passed through a hydrogen fluoride scrubber consisting of a tube packed with sodium fluoride in pellet form

Table I

| Example | Temp., °C. | Space velocity per hour | Percent conversion of fluoroform to— | | | | | | | | | |
|---|---|---|---|---|---|---|---|---|---|---|---|---|
| | | | Total product | Total saturates | Total unsaturates | $CF_4$ | $C_2F_6$ | $C_3F_8$ | $C_4F_{10}$ | $C_2F_5H$ | $C_3F_6$ | $C_4F_8$ |
| 1 | 600 | 60 | 17.6 | 17.6 | | 13.6 | 3.8 | 0.2 | | | | |
| 2 | 650 | 60 | 55.0 | 55.0 | | 43.4 | 10.8 | 0.8 | | | | |
| 3 | 675 | 60 | 58.9 | 58.9 | | 48.2 | 10.1 | 0.6 | | | | |
| 4 | 700 | 60 | 80.6 | 80.6 | | 70.2 | 9.8 | 0.6 | | | | |
| 5 | 725 | 60 | 83.0 | 83.0 | | 71.9 | 10.0 | 1.1 | | | | |
| 6 | 750 | 60 | 88.4 | 87.7 | 0.7 | 75.2 | 9.9 | 2.3 | 0.2 | 0.1 | | 0.7 |
| 7 | 775 | 60 | 89.3 | 88.4 | 0.9 | 69.2 | 14.7 | 4.0 | 0.3 | 0.2 | 0.1 | 0.8 |
| 8 | 800 | 60 | 92.1 | 90.3 | 1.8 | 61.0 | 22.5 | 6.4 | 0.2 | 0.2 | 0.3 | 1.5 |
| 9 | 825 | 60 | 93.3 | 90.1 | 3.2 | 48.3 | 34.2 | 7.2 | 0.1 | 0.3 | 0.6 | 2.6 |
| 10 | 880 | 60 | 94.4 | 90.6 | 3.8 | 31.9 | 53.1 | 5.1 | | 0.5 | 0.8 | 3.0 |
| 11 | 700 | 480 | 33.6 | 33.6 | | 27.6 | 5.7 | 0.3 | | | | |
| 12 | 725 | 480 | 40.4 | 40.4 | | 33.8 | 6.2 | 0.4 | | | | |
| 13 | 750 | 480 | 44.0 | 44.0 | | 37.5 | 6.0 | 0.5 | | | | |
| 14 | 775 | 480 | 48.4 | 48.3 | 0.1 | 40.6 | 6.6 | 0.8 | 0.1 | 0.2 | 0.1 | |
| 15 | 800 | 480 | 49.3 | 48.7 | 0.6 | 39.2 | 7.7 | 1.4 | 0.1 | 0.3 | 0.4 | 0.2 |
| 16 | 825 | 480 | 54.9 | 50.6 | 4.3 | 35.2 | 11.3 | 2.9 | 0.3 | a 0.9 | b 3.4 | 0.9 | a Includes 0.2% $C_3HF_7$.
b Includes 2.1% $C_2F_4$.

(3) $4CHF_3 \rightarrow C_3F_8 + C + 4HF$
(4) $5CHF_3 \rightarrow C_4F_{10} + C + 5HF$
(5) $2CHF_3 \rightarrow C_2HF_5 + HF$
(6) $3CHF_3 \rightarrow C_3HF_7 + 2HF$
(7) $2CHF_3 \rightarrow CF_2=CF_2 + 2HF$
(8) $3CHF_3 \rightarrow CF_3CF=CF_2 + 3HF$
(9) $4CHF_3 \rightarrow C_4F_8 + 4HF$ The presence of hydrogen fluoride in the reaction product and the deposition of free carbon on the catalyst in the course of the reaction both lend support to the above reaction course.

The following examples illustrate the invention:

EXAMPLES 1 TO 16

A center 15″ section of a nickel tube having an inside diameter of ⅞″ is packed with 82.5 grams (170 milliliters) of granules of activated carbon of a size passing through a 6 mesh standard sieve and retained on a 16 mesh standard sieve.

The activated carbon employed is obtained by the destructive distillation of bituminous coal and has a total surface area of 1050 to 1150 square meters per gram and a pore volume (within particle) of about 0.8 cubic centimeter per gram.

The catalyst bed is heated by an insulated electric furnace concentric with the tube and 24″ in length. Temperatures are measured by a thermocouple placed in a slot in the outer wall of the tube at the center of the furnace.

Fluoroform is passed through the catalyst bed at various temperatures. In one set of runs [Examples 1 through 10] a space velocity of 60 volumes of fluoroform (calculated at S.T.P., i.e., 0° C. and 760 mm. Hg) per volume of catalyst bed per hour (contact time of about 15 to 20 seconds) was employed. In a second series of runs (Examples 11 to 16) a space velocity of 480 volumes of held at 100° C. where hydrogen fluoride is removed, and then collected in refrigerated receivers. Analyses are made by gas-liquid chromatography and infrared spectra. From the total product analyses, the percent conversion of fluoroform to each product is determined on the basis of the stoichiometry shown in Equations 1 to 9 above. The results obtained in a series of 16 runs at temperatures varying from 600° to 880° C. are summarized in Table I.

Referring to Table I, it may be seen as the temperature increases at constant space velocity, the percent conversion also increases. Saturated fluorocarbons, principally $CF_4$, $C_2F_6$, and $C_3F_8$, are the principal products. At the higher temperatures a small proportion of perfluoroolefins $C_3F_6$ and $C_4F_8$ are also formed.

EXAMPLES 17 TO 22

Using the same equipment as in Examples 1 to 16, a series of runs was made over an activated carbon catalyst impregnated with 30% by weight of barium chloride. A portion of this catalyst weighing 70.6 grams and having a bulk volume of 170 milliliters is employed. Fluoroform is passed through the catalyst bed at space velocities varying from 60 to 480 volumes of fluoroform (at 0° C. and 760 mm. Hg) per volume of catalyst per hour (contact times ranging from about 2 to 20 seconds) at various temperatures ranging from 700° to 800° C. Product analyses and percent conversion of fluoroform to various products is determined as in Examples 1 to 16. The results of 6 runs are summarized in Table II.

In the series of runs shown in Table II it is to be noted that the presence of the barium chloride resulted in higher conversions to $C_2F_6$ and $C_3F_8$ and correspondingly lower conversions to $CF_4$ in contrast to the results obtained in runs 1 to 16 where unmodified activated carbon is employed. Compare for instance Example 4 with Example 17; Example 6 with Example 20; and Example 8 with Example 22.

Table II

| Example | Temp., °C. | Space velocity per hour | Percent conversion of Fluoroform to— | | | | Mol percent yield of— | | |
|---|---|---|---|---|---|---|---|---|---|
| | | | Total product | $CF_4$ | $C_2F_6$ | $C_3F_8$ | $CF_4$ | $C_2F_6$ | $C_3F_8$ |
| 17 | 700 | 60 | 90.4 | 21.4 | 59.0 | 11.0 | 23.7 | 65.3 | 11.1 |
| 18 | 700 | 120 | 78.6 | 19.0 | 48.5 | 10.6 | 24.2 | 61.7 | 13.5 |
| 19 | 700 | 240 | 53.5 | 11.8 | 33.6 | 6.2 | 22.0 | 63.0 | 11.6 |
| 20 | 750 | 60 | 97.4 | 27.7 | 61.9 | 7.2 | 28.5 | 63.5 | 7.4 |
| 21 | 750 | 480 | 56.8 | 12.1 | 37.5 | 5.8 | 21.3 | 66 | 12.2 |
| 22 | 800 | 60 | 99.7 | 22.1 | 68.7 | 8.9 | 21.2 | 69 | 8.9 |

EXAMPLES 23 AND 24

A 32" long section of a nickel tube having a 7/8" inside diameter is packed with 191.5 grams of activated carbon granules having the size range as in Example 1 to 16. A central 12" section of the catalyst bed is heated by means of an insulated electric furnace concentric with the catalyst tube to provide a heated catalyst bed section of 136 milliliters volume. Temperatures are measured by a thermocouple placed in a slot in the outer wall of the tube at the center of the furnace.

Fluoroform is passed through the catalyst bed at a space velocity of 1050 volumes of fluoroform (calculated at S.T.P.) per volume of heated catalyst bed per hour (contact time of about 0.9 second). The product is collected and compressed to 150 lbs./in.$^2$. Product analyses of the organic portion are made by gas-liquid chromatography. From the total product analyses the percent conversion of fluoroform to each product is determined on the basis of stoichiometry shown in Equations 1 to 9 above. The results of the two runs at temperatures of 1050° C. and 1060° C. respectively are shown in Table III.

Table III

| Example | Temp., ° C. | Percent conversion of $CF_3H$ to— | | | | | | | |
|---|---|---|---|---|---|---|---|---|---|
| | | Total product | $CF_4$ | $C_2F_6$ | $C_3F_8$ | $C_2HF_5$ | $C_2F_4$ | $C_3F_6$ | $C_4F_8$ |
| 23 | 1,050 | 83 | 0.8 | 28 | .7 | .5 | 4.8 | 31.4 | 14 |
| 24 | 1,060 | 94 | 1.4 | 47.2 | 1.0 | Trace | | 20.6 | 21 |

Note that in these runs at higher temperatures considerable amounts of perfluoroolefins ranging from $C_2F_4$ to $C_4F_8$ were produced as co-products. It may be further noted that the olefins are produced chiefly at the expense of $CF_4$ production which is a major product at the lower temperatures used in Examples 1 to 22 and only a minor product at the higher temperatures used in Examples 23 and 24.

It is to be understood that the foregoing embodiments of the invention are for purposes of illustration only, and that the invention is not limited thereto.

We claim:
1. A method for preparing predominantly saturated perfluorocarbons having 1 to 4 carbon atoms which comprises pyrolyzing fluoroform in the presence of a catalytic mass consisting of at least predominantly activated carbon at a temperature of from 500° to 1200 C.
2. A method in accordance with claim 1 in which said pyrolysis is carried out at a temperature of from 650° to 1000° C.
3. A method for preparing predominantly saturated perfluorocarbons having 1 to 4 carbon atoms which comprises pyrolyzing fluoroform at a temperature of from 500° to 1200° C. in the presence of a catalytic mass consisting at least predominantly of activated carbon impregnated with a metal chloride selected from the class consisting of the chlorides of the metals of Group IIA of the periodic table of elements.
4. A method in accordance with claim 3 in which said metal chloride is barium chloride.
5. A method of preparing predominantly saturated perfluorocarbons having 1 to 4 carbon atoms which comprises pyrolyzing fluoroform at a temperature of from 650° to 1000° C. in the presence of a catalytic mass consisting at least predominantly of activated carbon impregnated with a metal chloride selected from the class consisting of the chlorides of the metals of Group IIA of the periodic table of elements.
6. A method in accordance with claim 5 in which said metal chloride is barium chloride.

References Cited by the Examiner

UNITED STATES PATENTS

| 2,551,573 | 5/51 | Downing et al. | 260—653 |
| 3,009,966 | 11/61 | Hauptschein et al. | 260—653 |
| 3,016,405 | 1/62 | Lovejoy | 260—653 |

LEON ZITVER, *Primary Examiner.*

ALPHONSO D. SULLIVAN, *Examiner.*